US010806086B2

(12) United States Patent
Schoeny et al.

(10) Patent No.: US 10,806,086 B2
(45) Date of Patent: Oct. 20, 2020

(54) MULTI-FAN AGRICULTURAL HARVESTER CLEANING SYSTEM

(71) Applicant: Deere & Company, Moline, IL (US)

(72) Inventors: Jacob G. Schoeny, Bettendorf, IA (US); Matthew T. Wold, Bettendorf, IA (US)

(73) Assignee: Deere & Company, Moline, IL (US)

( * ) Notice: Subject to any disclaimer, the term of this patent is extended or adjusted under 35 U.S.C. 154(b) by 60 days.

(21) Appl. No.: 15/956,239

(22) Filed: Apr. 18, 2018

(65) Prior Publication Data
US 2019/0320587 A1  Oct. 24, 2019

(51) Int. Cl.
*A01F 12/44* (2006.01)
*A01F 12/48* (2006.01)
*A01F 7/06* (2006.01)
*A01F 12/46* (2006.01)

(52) U.S. Cl.
CPC ............ *A01F 12/444* (2013.01); *A01F 12/48* (2013.01); *A01F 7/062* (2013.01); *A01F 12/46* (2013.01)

(58) Field of Classification Search
CPC ........ A01F 12/444; A01F 12/48; A01F 12/46; A01F 7/062
See application file for complete search history.

(56) References Cited

U.S. PATENT DOCUMENTS

| | | | | |
|---|---|---|---|---|
| 1,582,660 A | * | 4/1926 | Baldwin | A01F 12/44 460/117 |
| 1,731,142 A | * | 10/1929 | Lee | A01F 12/00 460/75 |
| 1,864,772 A | * | 6/1932 | Sprague | A01F 12/44 460/86 |
| 2,670,845 A | * | 3/1954 | Busack | A01F 12/44 209/26 |
| 2,937,647 A | * | 5/1960 | Allen | A01F 12/44 460/85 |
| 2,950,720 A | * | 8/1960 | Sheard | A01D 75/282 460/86 |
| 3,392,832 A | * | 7/1968 | Allen | A01F 12/444 209/318 |
| 4,250,897 A | * | 2/1981 | Glaser | A01D 67/00 415/7 |
| 4,353,376 A | * | 10/1982 | Schuler | A01F 12/44 460/67 |
| 4,821,744 A | | 4/1989 | Turner et al. | |

(Continued)

FOREIGN PATENT DOCUMENTS

| | | |
|---|---|---|
| DE | 3228326 A1 | 2/1984 |
| DE | 19624733 A1 | 1/1998 |

(Continued)

OTHER PUBLICATIONS

European Search Report issued in counterpart European Patent Application No. 19168334.1 dated Sep. 5, 2019 (8 pages).

*Primary Examiner* — Arpad Fabian-Kovacs
(74) *Attorney, Agent, or Firm* — Joseph R. Kelly; Kelly, Holt & Christenson, LLC

(57) ABSTRACT

A cleaning system for an agricultural harvester includes a first and second cleaning systems. A plurality of fans of a substantially similar diameter are fluidically coupled to the first and second cleaning systems. A controller generates and sends control signals to the fans to control the speeds of the fans.

19 Claims, 4 Drawing Sheets

(56) References Cited

U.S. PATENT DOCUMENTS

| | | | |
|---|---|---|---|
| 2016/0135372 A1* | 5/2016 | Bonte | A01D 41/1271 460/99 |
| 2016/0192591 A1* | 7/2016 | Missotten | A01F 12/444 460/100 |
| 2016/0198629 A1* | 7/2016 | Duquesne | A01D 41/1276 701/36 |
| 2019/0045715 A1* | 2/2019 | Hillen | A01F 12/44 |
| 2019/0159404 A1* | 5/2019 | Matousek | A01F 12/56 |

FOREIGN PATENT DOCUMENTS

| | | | | |
|---|---|---|---|---|
| EP | 0077416 A1 | 4/1983 | | |
| EP | 0302210 A1 | 2/1989 | | |
| FR | 974068 A | 2/1951 | | |
| GB | 1127725 A | 2/1967 | | |
| WO | 8100503 A1 | 3/1981 | | |
| WO | WO-8100503 A1 * | 3/1981 | ............ | A01F 12/44 |
| WO | 2015000787 A1 | 1/2015 | | |
| WO | 2015028437 A1 | 3/2015 | | |

\* cited by examiner

US 10,806,086 B2

MULTI-FAN AGRICULTURAL HARVESTER CLEANING SYSTEM

FIELD OF THE DESCRIPTION

This description relates to agricultural harvesters. More particularly it relates to the fan system for a cleaning system assembly of an agricultural harvester.

BACKGROUND

Agricultural harvesters, such as combines or windrowers, travel through fields of agricultural crop, harvesting the crop. In one common arrangement, agricultural harvesting heads extend forward from the agricultural harvester to engage the plant stalks, sever them, and carry the severed crop into the body of the agricultural harvester itself. In the agricultural harvester body, the severed crop is separated into desired products (e.g., grain) and undesired products (e.g., chaff, stalks, cobs, etc.). The desired products are stored in a tank of the agricultural harvester and the undesired products are discarded out the rear of the harvester.

During separation of the crop into desired and undesired product, the crop undergoes cleaning in a cleaning system in which grain is separated from chaff, small debris and incompletely threshed seed, cob or pod, etc. The cleaning shoe often uses air, supplied by a fan, to lift the lighter debris from the seed.

The discussion above is merely provided for general background information and is not intended to be used as an aid in determining the scope of the claimed subject matter.

SUMMARY

A cleaning system for an agricultural harvester includes first and second cleaning systems. A plurality of fans of a substantially similar diameter are fluidically coupled to the first and second cleaning systems. A controller generates and sends control signals to the fans to control the speeds of the fans.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Combine harvester cleaning systems typically perform four different processes on a cut agricultural product to isolate the final product. These processes are threshing, chaffing, sieving and screening. Threshing involves a large drum that beats the agricultural product against several concaves to begin separating the desired product from the undesired product. Sieving involves isolating the desired product from the undesired product using airflow and using a sieve where the desired product penetrates the sieve and the undesired materials are carried over the device. Chaffing involves using a chaffer to further separate the desired product from the undesired product and using air to isolate the desired product by lifting lighter debris from the denser desired product. Screening involves isolating the desired product from the undesired product by a device where the desired product is carried over the device and the undesired material penetrates it. The sieve, chaffer (and screens) are often supported by a cleaning shoe which, as described below, is an oscillating structure that oscillates relative to a frame of the harvester. The oscillation assists in the various separation processes. There may be more than one cleaning shoe on a machine as well.

Figure 1:
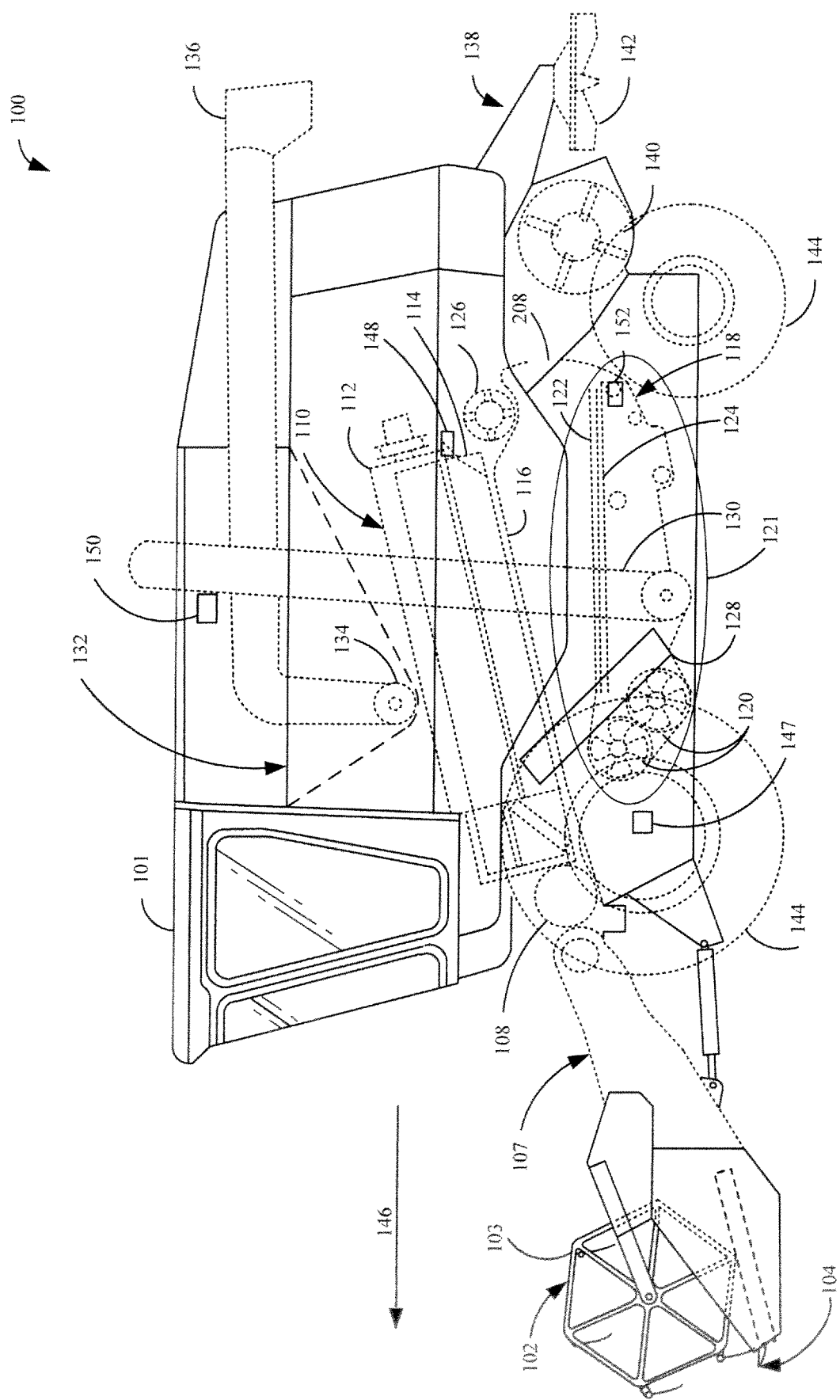
FIG. 1 is a partial pictorial, partial schematic view of an example of a mobile harvesting machine.

FIG. 1 is a partial pictorial, partial schematic, illustration of an agricultural machine 100, in an example where machine 100 is a combine harvester (also referred to as combine 100 or machine 100). It can be seen in FIG. 1 that combine 100 illustratively includes an operator compartment 101, which can have a variety of different operator interface mechanisms, for controlling combine 100. Combine 100 can include a set of front end equipment that can include header 102, and a cutter generally indicated at 104. It can also include a feeder house 107, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe or pressurized housing) 118 that, itself, can include one or more cleaning fans 120, chaffer 122 and sieve 124. The material handling subsystem in combine 100 can include (in addition to a feeder house 107 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine that drives ground engaging wheels 144 or tracks, etc. It will be noted that combine 100 may also have more than one of any of the subsystems mentioned above (such as left and right cleaning shoes, left and right separators, sequential cleaning shoes, a precleaner and a cleaning shoe, etc.).

In operation, and by way of overview, combine 100 illustratively moves through a field in the direction indicated by arrow 146. As it moves, header 102 engages the crop to be harvested and gathers it toward cutter 104. After it is cut, the crop can be engaged by reel 103 that moves the crop to feeding tracks (not shown) that move the crop to the center of the head 102 and then through a center feeding track in feeder house 107 toward feed accelerator 108, which accelerates the crop into thresher 110. The crop is threshed by rotor 112 rotating the crop against concaves 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by one or more cleaning fans 120. That residue can also be moved rearwardly in combine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152. Ground speed sensor 147 illustratively senses the travel speed of combine 100 over the ground. This can be done by sensing the speed of rotation of the wheels, the drive shaft, the axle, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118 or by each of a plurality of sequential cleaning shoes (described in more detail below) or by a precleaner and a cleaning shoe (also described in more detail below). In one example, sensors 152 are strike sensors which count grain strikes per unit of time (or per unit of distance traveled) to provide an indication of the cleaning shoe grain loss. The strike sensors for the right and left sides of the cleaning shoe (or for the sequential cleaning shoes or precleaner and cleaning shoe) can provide individual signals, or a combined or aggregated signal. It will be noted that sensors 152 can comprise only a single sensor as well, instead of separate sensors for each shoe.

Separator loss sensor 148 provides a signal indicative of grain loss in the left and right (or sequential) separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

Figure 2:
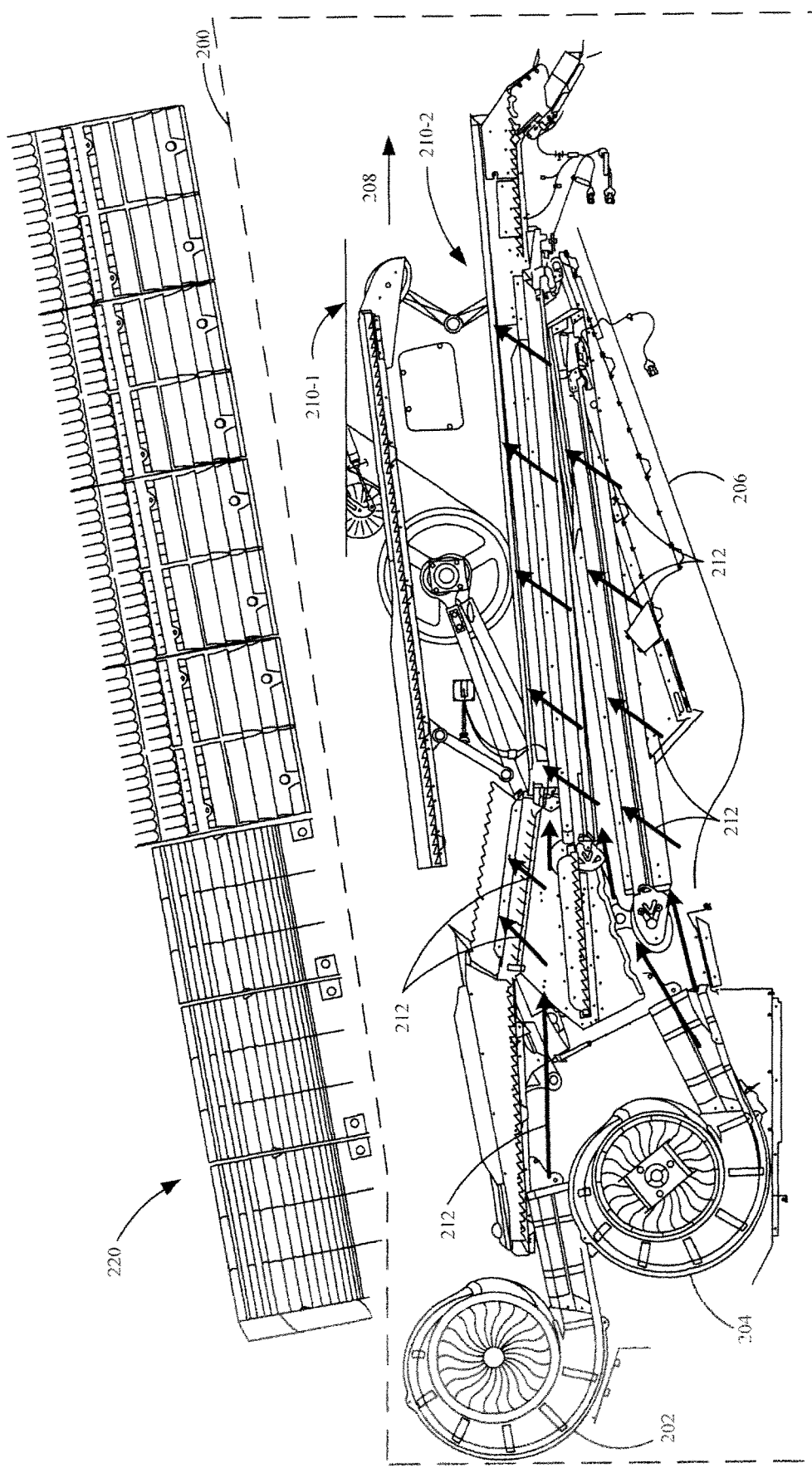
FIG. 2 is a partial pictorial, partial schematic view of one example of a cleaning system on a mobile harvesting machine.

FIG. 2 illustrates a partial pictorial, partial schematic view of one example of a cleaning system assembly on a mobile harvesting machine, such as machine 100. Cleaning system assembly 200 may be similar to cleaning system 118 shown in FIG. 1, or different. They are described separately by way of example only.

Cleaning system assembly 200 includes a variety of components for processing and cleaning a cut agricultural product. An agricultural product enters cleaning system assembly 200 through concaves 220. A threshing drum (not shown) beats the agricultural product against concaves 220 and smaller portions of the agricultural product (the threshed material) fall through concaves 220 onto cleaning systems 210-1 and 210-2. System 210-1 is illustratively a pre-cleaner which oscillates and acts to separate some larger material from the grain and output the pre-cleaned material to system 210-2. System 210-2 illustratively receives the pre-cleaned material from system 210-1 and includes a sieve and chaffer and oscillates to further separate the desired agricultural product (e.g., the grain) from the undesired product (chaff, etc.).

Systems 210-1 and 210-2 are disposed inside a housing 206 that defines a chamber with an inlet (to receive air flow and the threshed material) and an outlet shown generally at 208. Systems 210-1 and 210-2 also allow airflow through or around them. Airflow (indicated by arrows 212) is generated from fans 202 and 204 and is directed into the chamber defined by housing 206, which acts to pressurize the chamber defined by housing 206. As airflow passes through or around systems 210-1 and 210-2 the chaff and small debris are taken away with the airflow to be removed from the combine through an outlet 208 in housing 206. In some current harvesters, there is one cleaning fan used in the cleaning system. However, in the example shown in FIG. 2, there are two cleaning fans 202 and 204. Fan 202 directs its airflow toward a first of the two cleaning systems 210-1, while fan 204 directs its airflow toward a second of the two cleaning systems 210-2.

In one example, the speed of fans 202 and 204 is controlled. For instance, if the fan speed of fan 202 is too high, then the grain loss detected by a loss detector corresponding to the cleaning system 210-1 may increase to an undesired level. However, if it is too low, the airflow generated by the fan may not cleaning adequately, resulting in a degradation in the cleanliness of the grain entering the clean grain tank. The same is true of cleaning fan 204.

However, both fans 202 and 204 are blowing into the chamber defined by housing 206. The ability of a fan to build pressure in the chamber defined by housing 206 is roughly a function of the diameter of the fan blades. Because operation of the fans increases the pressure in housing 206, the way the two fans interact (the airflow characteristics generated by the fans relative to one another) can be very difficult to characterize, especially if the fans are of different sizes. Under those circumstances, changing fan speed of one fan affects the airflow characteristics of the other fan according to a complex relationship, making fan speed control very difficult.

Therefore, in accordance with one example, fans 202 and 204 are substantially the same diameter. By substantially the same diameter it is meant that the diameters of the fans are within at least 30% of one another and may be within 20%, 10%, or 5% of each other. In another example, the diameters of fans 202 and 204 are so similar that they are interchangeable with one another in cleaning system assembly 200.

Figure 3:
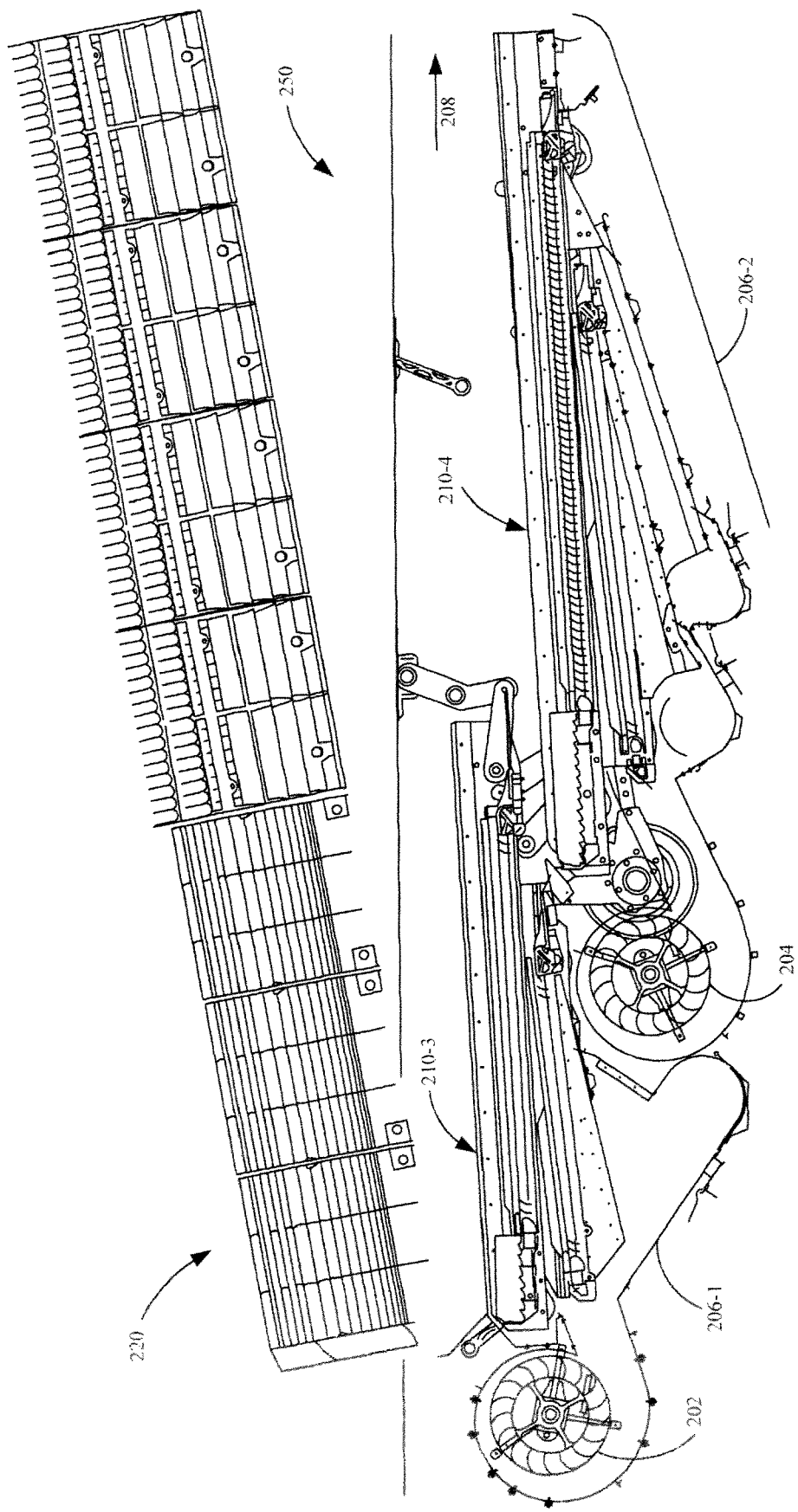
FIG. 3 is a partial pictorial, partial schematic view of another example of a cleaning system on a mobile harvesting machine.

FIG. 3 illustrates a partial pictorial, partial schematic view of another example of a cleaning system assembly 250 on a mobile harvesting machine. As with cleaning system assembly 200, cleaning system assembly 250 is described separate from cleaning system 118 for the sake of example only, but it may form part of, or replace, system 118 in harvester 100. Cleaning system assembly 250 includes a variety of components for processing and cleaning a cut agricultural product. Many of these components are similar to those shown in FIG. 2 and they are similarly numbered. The example shown in FIG. 3, however, shows that the structural encloser 206 has two separate portions 206-1 and 206-2 both of which, together, form a chamber that has an internal pressure that increases when either fan 202 or 204 (or both of them) are operating. Further, cleaning system assembly 250 has two separate cleaning shoes 210-3 and 210-4, respectively, each with its own separate cleaning fan 202 and 204. Cleaning shoe 210-3 has a sieve and chaffer to clean material received through concaves 220. It outputs material to cleaning shoe 210-4. Cleaning shoe 210-4 has a sieve and chaffer and receives material from cleaning shoe 201-3 and performs additional cleaning on that material. Both cleaning shoes 210-3 and 201-4 are mounted for oscillating movement relative to a frame of machine 100.

In the example shown in FIG. 3, the portions 206-1 and 206-2 are still in fluidic communication with each other meaning that a fan speed change of one fan will change the pressure in both portions 206-1 and 206-2 of the chamber and affect the airflow characteristics of the other fan. Therefore, as with the example discussed alone with respect to FIG. 3, fans 202 and 204 are substantially the same size. They can be controlled together or separately, and the airflow characteristics of the fans 202 and 204 can be known in a much more precise and predictable way. The fan speed can be controlled so that desired airflow characteristics are." achieved.

Figure 4:
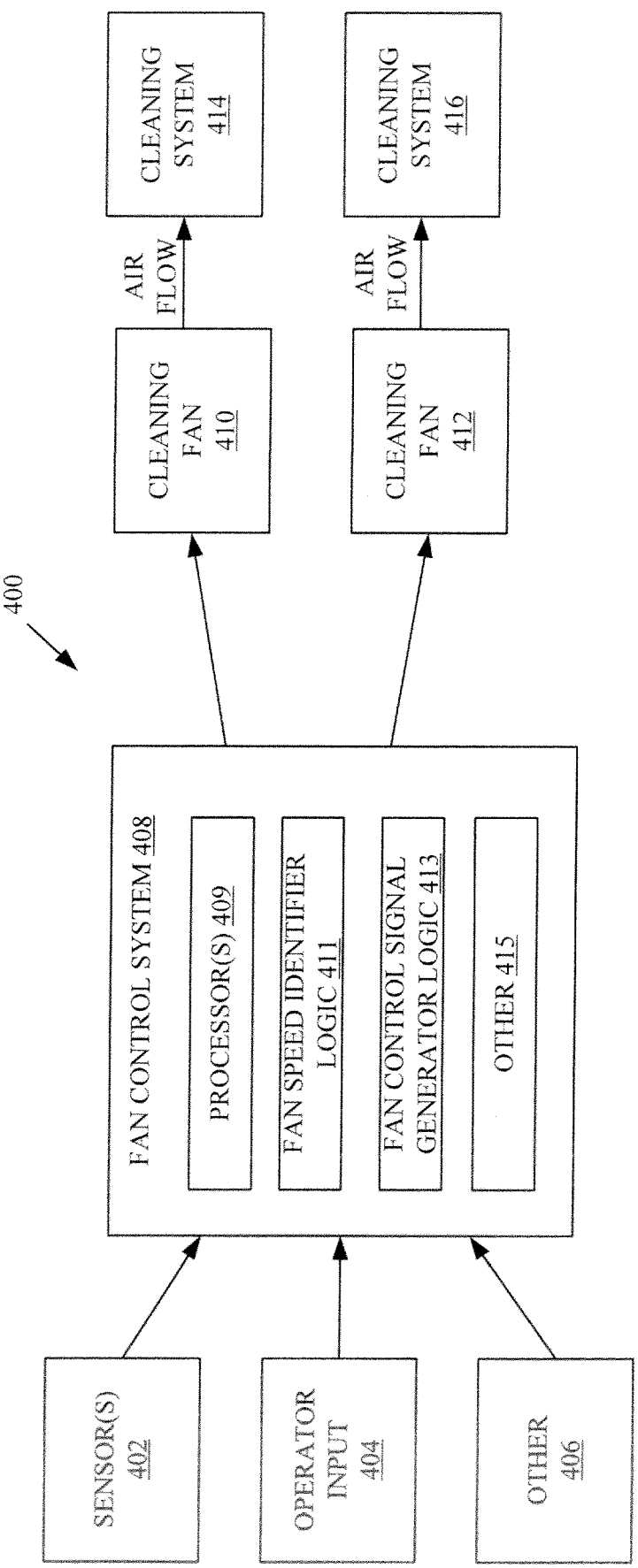
FIG. 4 is a block diagram of a portion of an example cleaning system.

FIG. 4 illustrates a block diagram of an example cleaning system assembly 400 which can be one of the cleaning system assemblies 200 or 250 discussed above. The cleaning system assembly 400 includes a fan control system 408, which, itself, includes a processor 409, fan speed controller logic 411, fan control signal generator 413, and it can include other items 415. Cleaning system assembly 400 also includes two cleaning fans 410 and 412 and two cleaning systems 414 and 416. Cleaning systems 414 and 416 can be a pre-cleaner and a cleaning shoe, or two sequential cleaning shoes, as described above with respect to FIGS. 2 and 3. Each cleaning fan 410 and 412 provides airflow and pressure to its own respective cleaning system 414 and 416. The fan control system 408 generates signals that control the speed of fans 410 and 412. The control of fans 410 and 412 can be the same, e.g. control system 408 will send the same control signals to both fan 410 and 412 so they are controlled at the same speed. Control system 408 can also control the fans independently of one another.

To determine appropriate control, fan control system 408 can receive input from sensors 402, operator input 404 from an operator input mechanism on machine 100, or from other sources as indicated by block 406. Sensors 402 can include pressure sensors, tailings sensors, grain strike sensors, motor load sensors, etc. Operator input 404 can identify a manual fan speed selection or a preset speed based on the type of grain, among other things. Different grains may need different airflows to isolate the grain from the chaff, therefore, in one example, fan control system 408 can control fans 410 and 412 at variable speeds to accommodate for different grains, to achieve a desired grain loss measurement. Based on the various inputs, fan speed identifier logic 441 identifies a fan speed that fans 410 and 412 are to be commanded to. Control signal generator logic 413 then generates the control signals that are provided to fans 410 and 412 to control their speeds.

In one example, fans 410 and 412 and cleaning systems 414 and 416 share a single pressurized housing. To maintain a desired airflow/pressure in the pressurized housing fan control system 408 controls the fans 410 and 412 in coordination with one another. They can be controlled to the same speed or different speeds. In another example, the fans 410 and 412 can be sized (e.g., have a blade diameter) so they are within 30%, 20%, 10%, or 5% of the size of each other. They can also be similar enough in size that they are interchangeable.

Example 1 is an agricultural harvester, comprising:
a threshing system that receives crop material and performs a threshing operation on the crop material, to generate threshed crop material;
a first cleaning system that receives the threshed crop material and performs a first cleaning operation on the threshed crop material and outputs the crop material from the first cleaning system;
a first cleaning fan mounted to the agricultural harvester to direct airflow through the first cleaning system;
a second cleaning system that receives the crop material output from the first cleaning system and performs a second cleaning operation on the crop material;
a second cleaning fan, that has substantially a same diameter as the first cleaning fan, mounted to the agricultural harvester to direct airflow through the second cleaning system; and
a fan controller that generates fan control signals to control fan speed of the first and second cleaning fans.

Example 2 is the agricultural harvester of any or all previous examples wherein the fan controller is configured to control the fan speed of the first and second cleaning fans in coordination with one another.

Example 3 is the agricultural harvester of any or all previous examples wherein the fan controller is configured to control the fan speed of the first and second cleaning fans independently of one another.

Example 4 is the agricultural harvester of any or all previous examples wherein the fan controller is configured to control the first and second cleaning fans to operate at a same fan speed.

Example 5 is the agricultural harvester of any or all previous examples wherein the first cleaning fan has a fan diameter that is within approximately twenty percent (20%) of a fan diameter of the second cleaning fan.

Example 6 is the agricultural harvester of any or all previous examples wherein the first cleaning fan has a fan diameter that is within approximately ten percent (10%) of the fan diameter of the second cleaning fan.

Example 7 is the agricultural harvester of any or all previous examples wherein the first cleaning fan has a fan diameter that is similar enough to the fan diameter of the second cleaning fan that the first and second cleaning fans are interchangeable.

Example 8 is the agricultural harvester of any or all previous examples and further comprising:
a structural housing that defines a chamber with an inlet and an outlet, wherein the first and second cleaning systems are disposed in the chamber and wherein the first and second cleaning fans are positioned to direct airflow into the chamber to increase an internal pressure in the chamber.

Example 9 is the agricultural harvester of any or all previous examples wherein the first cleaning system comprises a pre-cleaning system.

Example 10 is the agricultural harvester of any or all previous examples wherein the first cleaning system comprises:
a first cleaning shoe having a first sieve and a first chaffer mounted for oscillating movement relative to a frame of the agricultural harvesting machine.

Example 11 is the agricultural harvester of any or all previous examples wherein the second cleaning system comprises:
a second cleaning shoe having a second sieve and a second chaffer mounted for oscillating movement relative to the frame of the agricultural harvesting machine.

Example 12 is a grain cleaning assembly on an agricultural harvester that includes a threshing system that receives crop material and performs a threshing operation on the crop material, to generate threshed crop material, the grain cleaning assembly comprising: a first cleaning system that receives the threshed crop material and performs a first cleaning operation on the threshed crop material and outputs the crop material from the first cleaning system;
  a first cleaning fan mounted to the agricultural harvester to direct airflow through the first cleaning system;
  a second cleaning system that receives the crop material output from the first cleaning system and performs a second cleaning operation on the crop material; and
  a second cleaning fan, that has substantially a same diameter as the first cleaning fan, mounted to the agricultural harvester to direct airflow through the second cleaning system Example 13 is the grain cleaning assembly of any or all previous examples and further comprising:
  a fan controller that generates fan control signals to control fan speed of the first and second cleaning fans.

Example 14 is the grain cleaning assembly of any or all previous examples wherein the first cleaning fan has a fan diameter that is within approximately twenty percent (20%) of a fan diameter of the second cleaning fan.

Example 15 is the grain cleaning assembly of any or all previous examples wherein the first cleaning fan has a fan diameter that is within approximately ten percent (10%) of the fan diameter of the second cleaning fan.

Example 16 is the grain cleaning assembly of any or all previous examples wherein the first cleaning fan has a fan diameter that is similar enough to the fan diameter of the second cleaning fan that the first and second cleaning fans are interchangeable.

Example 17 is the grain cleaning assembly of any or all previous examples and further comprising:
  a structural housing that defines a chamber with an inlet and an outlet, wherein the first and second cleaning systems are disposed in the chamber and wherein the first and second cleaning fans are positioned to direct airflow into the chamber to increase an internal pressure in the chamber.

Example 18 is the grain cleaning assembly of any or all previous examples wherein the first cleaning system comprises a pre-cleaning system.

Example 19 is the grain cleaning assembly of any or all previous examples wherein the first cleaning system comprises a first cleaning shoe having a first sieve and a first chaffer mounted for oscillating movement relative to a frame of the agricultural harvesting machine and wherein the second cleaning system comprises a second cleaning shoe having a second sieve and a second chaffer mounted for oscillating movement relative to the frame of the agricultural harvesting machine.

Example 20 is a grain cleaning assembly on an agricultural harvester that includes a threshing system that receives crop material and performs a threshing operation on the crop material, to generate threshed crop material, the grain cleaning assembly comprising:
  a structural housing that defines a chamber with an inlet and an outlet;
  a first cleaning system disposed in the chamber to receive the threshed crop material and configured to perform a first cleaning operation on the threshed crop material and output the crop material from the first cleaning system;
  a first cleaning fan mounted to the agricultural harvester to direct airflow into the chamber and through the first cleaning system;
  a second cleaning system disposed in the chamber to receive the crop material output from the first cleaning system and perform a second cleaning operation on the crop material; and
  a second cleaning fan, that has substantially a same diameter as the first cleaning fan, mounted to the agricultural harvester to direct airflow into the chamber and through the second cleaning system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural harvester, comprising:
  a threshing system that receives crop material, performs a threshing operation on the crop material, and generates threshed crop material;
  a structural housing, having a first portion and a second portion, that defines a chamber with an inlet and an outlet, wherein the first portion is in fluidic communication with the second portion;
  a first cleaning system disposed in the first portion of the chamber that receive the threshed crop material and performs a first cleaning operation on the threshed crop material and outputs the crop material from the first cleaning system;
  a first cleaning fan mounted to the agricultural harvester that directs airflow through the first cleaning system and into the first portion of the chamber to increase an internal pressure in the chamber;
  a second cleaning system disposed in the second portion of the chamber that receives the crop material output from the first cleaning system and performs a second cleaning operation on the crop material;
  a second cleaning fan, that has a same diameter as the first cleaning fan, mounted to the agricultural harvester that directs airflow through the second cleaning system and into the second portion of the chamber to increase the internal pressure in the chamber; and
  a fan controller that generates fan control signals that control fan speed of the first and second cleaning fans.

2. The agricultural harvester of claim 1 wherein the fan controller controls the fan speed of the first and second cleaning fans in coordination with one another.

3. The agricultural harvester of claim 1 wherein the fan controller controls the fan speed of the first and second cleaning fans independently of one another.

4. The agricultural harvester of claim 1 wherein the fan controller controls the first and second cleaning fans to operate at a same fan speed.

5. The agricultural harvester of claim 1 wherein the first Cleaning fan has a fan diameter that is within approximately twenty percent (20%) of a fan diameter of the second cleaning fan.

6. The agricultural harvester of claim 5 wherein the first cleaning fan has a fan diameter that is within approximately ten percent (10%) of the fan diameter of the second cleaning fan.

7. The agricultural harvester of claim 1 wherein the first cleaning fan has a fan diameter that is similar enough to the fan diameter of the second cleaning fan that the first and second cleaning fans are interchangeable.

8. The agricultural harvester of claim 1 wherein the first cleaning system comprises a pre-cleaning system.

9. The agricultural harvester of claim 1 wherein the first cleaning system comprises:

a first cleaning shoe having a first sieve and a first chaffer mounted for oscillating movement relative to a frame of the agricultural harvesting machine.

10. The agricultural harvester of claim 9 wherein the second cleaning system comprises:
a second cleaning shoe having a second sieve and a second chaffer mounted for oscillating movement relative to the frame of the agricultural harvesting machine.

11. A grain cleaning assembly on an agricultural harvester that includes a threshing system that receives crop material and performs a threshing operation on the crop material, to generate threshed crop material, the grain cleaning assembly comprising:
a structural housing having a first portion and a second portion that defines a chamber with an inlet and an outlet, wherein the first portion is in fluidic communication with the second portion;
a first cleaning system disposed in the first portion of the chamber that receives the threshed crop material and performs a first cleaning operation on the threshed crop material and outputs the crop material from the first cleaning system;
a first cleaning fan mounted to the agricultural harvester that directs airflow through the first cleaning system and into the first portion of the chamber to increase an internal pressure in the chamber;
a second cleaning system disposed in the second portion of the chamber that receives the crop material output from the first cleaning system and performs a second cleaning operation on the crop material; and
a second cleaning fan, that has a same diameter as the first cleaning fan, mounted to the agricultural harvester that directs airflow through the second cleaning system and into the second portion, of the chamber to increase the internal pressure in the chamber.

12. The grain cleaning assembly of claim 11 and further comprising:
a fan controller that generates fan control signals that control fan speed of the first and second cleaning fans.

13. The grain cleaning assembly of claim 11 wherein the first cleaning fan has a fan diameter that is within approximately twenty percent (20%) of a fan diameter of the second cleaning fan.

14. The grain cleaning assembly of claim 13 wherein the first cleaning fan has a fan diameter that is within approximately ten percent (10%) of the fan diameter of the second cleaning fan.

15. The grain cleaning assembly of claim 14 wherein the first cleaning fan has a fan diameter that is similar enough to the fan diameter of the second cleaning fan that the first and second cleaning fans are interchangeable.

16. The grain cleaning assembly of claim 11 and further comprising:
a structural housing that defines a chamber with an inlet and an outlet, wherein the first and second cleaning systems are disposed in the chamber and wherein the first and second cleaning fans are positioned to direct airflow into the chamber to increase an internal pressure in the chamber.

17. The grain cleaning assembly of claim 11 wherein the first cleaning system comprises a pre-cleaning system.

18. The grain cleaning assembly of claim 11 wherein the first cleaning system comprises a first cleaning shoe having a first sieve and a first chaffer mounted for oscillating movement relative to a frame of the agricultural harvesting machine and wherein the second cleaning system comprises a second cleaning shoe having a second sieve and a second chaffer mounted for oscillating movement relative to the frame the agricultural harvesting machine.

19. A grain cleaning assembly on an agricultural harvester that includes a threshing system that receives crop material and performs a threshing operation on the crop material, to generate threshed crop material, the grain cleaning assembly comprising:
a structural housing having a first portion and a second portion that defines a chamber with an inlet and an outlet, wherein the first portion is in fluidic communication with the second portion;
a first cleaning system, disposed in the first portion of the chamber, that receives the threshed crop material and performs a first cleaning operation on the threshed crop material and outputs the crop material from the first cleaning system;
a first cleaning fan mounted to the agricultural harvester that directs airflow into the first portion of the chamber and through the first cleaning system;
a second cleaning system, disposed in the second portion of the chamber, that receives the crop material output from the first cleaning system and performs a second cleaning operation on the crop material;
a second cleaning fan, that has a same diameter as the first cleaning fan, mounted to the agricultural harvester that directs airflow into the second portion of the chamber and through the second cleaning system; and
wherein the first cleaning fan has a fan diameter that is the same as the fan diameter of the second cleaning fan such that the first and second cleaning fans are interchangeable and build a controllable pressure in the first portion of the chamber and in the second portion of the chamber.

* * * * *